(12) United States Patent
Halberstadt

(10) Patent No.: US 8,427,847 B2
(45) Date of Patent: Apr. 23, 2013

(54) RESONANT CONVERTER

(75) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 203 days.

(21) Appl. No.: 13/139,448

(22) PCT Filed: Dec. 17, 2009

(86) PCT No.: PCT/IB2009/055814
§ 371 (c)(1),
(2), (4) Date: Jun. 13, 2011

(87) PCT Pub. No.: WO2010/073196
PCT Pub. Date: Jul. 1, 2010

(65) Prior Publication Data
US 2011/0242856 A1    Oct. 6, 2011

(30) Foreign Application Priority Data

Dec. 22, 2008  (EP) .................................. 08106023

(51) Int. Cl.
*H02M 3/335* (2006.01)
(52) U.S. Cl.
USPC ........................................ 363/17; 363/21.02
(58) Field of Classification Search ............ 363/17,
363/97, 21.02, 21.03, 21.04, 21.08, 21.09,
363/21.12, 21.16, 21.17; 323/222, 266, 282,
323/284, 285, 286
See application file for complete search history.

(56) References Cited

U.S. PATENT DOCUMENTS

| RE33,866 | E * | 3/1992 | Schutten et al. ................ 363/17 |
| 6,151,231 | A * | 11/2000 | Saint-Pierre et al. ........... 363/95 |
| 6,178,099 | B1 | 1/2001 | Schutten et al. |
| 6,418,038 | B2 * | 7/2002 | Takahama et al. .............. 363/17 |
| 7,944,716 | B2 * | 5/2011 | Halberstadt ..................... 363/25 |
| 2001/0036090 | A1* | 11/2001 | Halberstadt ................ 363/21.02 |
| 2002/0149890 | A1* | 10/2002 | Kaneko et al. ................... 361/18 |
| 2008/0266908 | A1* | 10/2008 | Halberstadt ................ 363/21.02 |
| 2009/0034299 | A1* | 2/2009 | Lev ................................. 363/17 |
| 2011/0002145 | A1 | 1/2011 | Halberstadt |
| 2011/0157920 | A1* | 6/2011 | Adragna et al. ........... 363/21.03 |

FOREIGN PATENT DOCUMENTS

| GB | 2 437 556 A | 10/2007 |
| WO | 01/20758 A1 | 3/2001 |
| WO | 2006/103606 A1 | 10/2006 |
| WO | 2006/103609 A2 | 10/2006 |

OTHER PUBLICATIONS

Oruganti, R. "Resonant Power Processors, Part I—State Plane Analysis," IEEE. Trans. On Industry Applications, vol. 1A-21, No. 6, pp. 1453-1460 (1985).

(Continued)

*Primary Examiner* — Timothy J Dole
*Assistant Examiner* — Ivan Laboy Andino

(57) ABSTRACT

A resonant converter (10) comprising a voltage compensation circuit (72, 73) configured to generate a periodic compensation voltage signal ($V_{slopecompens}$) at a switching frequency of the converter such that conduction intervals (31, 32) are ended according to first and second voltage levels in combination with the periodic compensation signal.

12 Claims, 15 Drawing Sheets

OTHER PUBLICATIONS

Oruganti, R. "Resonant Power Processors, Part II—Methods of Control," IEEE. Trans. On Industry Applications, vol. 1A-21, No. 6, pp. 1461-1471 (1985).

Oruganti, R. et al. "Resonant-Tank control of Parallel Resonant Converter," IEEE Trans. On Power Electronics, vol. 8, No. 2, pp. 127-134 (Apr. 1993).

Zhang, Y. et al. "LLC Resonant Converter for 48V to 0.9V VRM", 35$^{th}$ Ann. IEEE Power Electronics Specialists Conf., vol. 3, pp. 1848-1854 (2004).

International Search Report and Written Opinion for International patent application No. PCT/IB2009/055814 (Mar. 30, 2010).

* cited by examiner

Ipeak = 2    poutrel_v = 0.5    poutrel = 0.5    voutrel = 0.7    Vsupply = 400

RESONANT CONVERTER

The invention relates to control of resonant converters at varying levels of output power.

For electrical power converters, in particular where output power levels in excess of 100 W may be required, resonant converters are of interest due to their high efficiency and small size, i.e. high power density. One particular type of resonant converter is a resonant LLC converter, in which a capacitor and two inductors form a resonant circuit as part of an input stage to the converter. An exemplary resonant LLC converter, and its mode of operation, is described in WO 2006/103609, in which the converter is controlled according to schemes known as "$I_{peak}$ control" and "$V_{cap}$ control". These schemes, which are relevant to the present invention, are described in WO'609 in detail and in summary below.

An exemplary resonant LLC converter is illustrated in FIG. 1a. The converter 10 comprises a primary resonant circuit (or tank) 2 having a capacitor $C_r$, an inductor L1 and a magnetizing inductance L2. A transformer and secondary rectifier circuit 3 provides a DC output voltage Vo across output terminals 4. The output current in the secondary circuit 3 can be made continuous by adding a series inductance L3. The circuit comprises three parts. A first part is the control part 1, comprising control logic CL configured to generate control signals for opening and closing the switches 6, 7 by means of drivers HSD (high side driver) and LSD (low side driver). A second part is the primary circuit 2 and a third part is the secondary circuit 3. The resonant converter 10 is connected to a voltage supply Vs so that electrical energy may be supplied to a load connected to the output terminals 4 on the secondary circuit 3. The resonant converter 10 comprises first 6 and second 7 series-arranged, controllable switches (typically transistors such as FETs) that are connected to the supply source Vs, the first switch 6 being a high side switch (HSS), connected at one leg to the supply source Vs, the second switch 7 a low side switch (LSS) connected at one leg to ground. A full bridge configuration is also possible, having a further pair of switches HSS1, LSS1, connected as shown in FIG. 1b.

The converter 10 is conventionally controlled by the frequency at which the switches 6, 7 are controlled, typically with a duty cycle of around 50% applied under the control of the control logic CL. The output power of the converter may be controlled by varying the operating frequency, which allows a resonant converter to adjust its output power according to a changing load, in order to maintain a constant output voltage. The duty cycle may also be controlled to determine the output power level.

In a converter of the type described in WO'609, shown in FIG. 1a, the duty cycle and switching frequency variation may be combined in such a way that smooth regulation of the output power can be realized. The converter is not controlled by the frequency and duty cycle directly, but by using instantaneous measurements of current and voltage at the primary side of the transformer. The parameters $I_{prim}$ and $V_{cap1}$ as indicated in FIG. 1a are used to provide this control. These parameters are compared during each conduction interval (i.e. when one or the other switch 6, 7 is conducting), with two control values for each parameter. The converter is thus controlled in a cycle-by-cycle manner. The current $I_{prim}$, also referred to as the primary current, is the current flowing in the resonant tank in the primary circuit in accordance with opening and closing of the switches 6, 7, while the voltage $V_{cap1}$ is the voltage at a node 9 between capacitor $C_r$ and inductor $L_1$, $V_{cap1}$ also referred to as the capacitor voltage. A further voltage $V_{hb}$, measured at a node 8 between the switches 6, 7 may also be measured.

A first conduction interval occurs while the first (or high side) switch 6 is turned on, and a second conduction interval occurs while the second (or low side) switch 7 is turned on. The first and second switches 6, 7 are turned off in accordance with four control parameters: $I_{peakH}$ and $V_{capH}$ being the control parameters during the high side switch conduction interval for parameters $I_{peak}$ and $V_{cap1}$ respectively, while $I_{peakL}$ and $V_{capL}$ are the control parameters during the low side switch conduction interval. These parameters can be set in the control logic CL according to the desired output power level.

The high side switch 6 and the low side switch 7 are turned on at different times, for example using an adaptive non-overlap or fixed non-overlap scheme. One switch is turned on only after the other switch is turned off, for example after a fixed interval. The interval may be adjusted according to various criteria.

FIG. 2 illustrates the control logic CL in more detail, with the various inputs and outputs involved in operation of the control logic. The control logic CL receives inputs $V_{bus}$, $P_{outrel}$, $V_{cap1}$ and $I_{prim}$, and outputs control signals $Q_{HSS}$, $Q_{LSS}$ to control switches 6, 7 (FIG. 1a). $V_{bus}$ is the bus voltage, $P_{outrel}$ is a relative power output signal (i.e. indicating a range from 0 to 100% of output power), and $V_{cap1}$, $I_{prim}$ are as outlined above. The control logic CL is configured to end the HSS conduction stroke at the moment $V_{cap1}$ reaches the set level $V_{capH}$. The LSS conduction stroke is correspondingly ended at the moment that $V_{cap1}$ reaches the level $V_{capL}$. The start of each conduction interval is determined to be a short time after the end of the preceding conduction interval, this interval being known as the non-overlap time.

The following relationship describes the output power, $P_{out}$, of the converter using this $V_{cap}$ control method:

$$P_{out} = C_r V_{bus}^2 P_{outrel} F_{switch} \text{eff} \tag{1}$$

$$\text{where } P_{outrel} = 1 - \frac{V_{capH} - V_{capL}}{V_{bus}}$$

$P_{outrel}$ is the control parameter that determines the output power, $F_{switch}$ is the switching frequency of the HSS and LSS switches, and eff is the efficiency of the converter. The output current $I_{out}$ can be given as:

$$I_{out} = \frac{C_r}{V_{out}} V_{bus}^2 P_{outrel} F_{switch} \text{eff} \tag{2}$$

The transfer from $P_{outrel}$ to $I_{out}$ can then be expressed as:

$$\frac{dI_{out}}{dP_{outrel}} = \frac{C_r}{V_{out}} V_{bus}^2 F_{switch} \text{eff} \tag{3}$$

For typical normal output voltages, FIGS. 3a to 3c illustrate the variation in the various relevant parameters over several switching cycles. In these figures, the supply voltage $V_s$ is 400V and the relative output power $P_{outrel}$ is 0.7. FIG. 3a shows the primary current $I_{prim}$ and the magnetising current $I_{LM}$, and indicates the parameters $I_{peakL}$ and $I_{peakH}$ as dc values. The general shape of the primary current $I_{prim}$ is a part of a sine wave, whereas the magnetizing current $I_{LM}$ in the transformer is in the form of a roughly triangular waveform. The amplitude of the primary current waveform is proportional to the output current $I_{out}$ (or load current $I_{load}$), which is shown (without smoothing) in FIG. 3c. A local maximum or minimum occurs in the primary current $I_{prim}$ during the switch conduction time for medium to large output powers.

FIG. 3b shows the capacitor voltage $V_{cap1}$ along with the voltage levels $V_{capH}$ and $V_{capL}$ and a reflected version of the output voltage $V_{out}$, $V_{outreflected}$, which indicates the switching cycles showing the HSS switching interval 31 and the LSS switching interval 32. The HSS conduction stroke or interval 31 ends at the moment $V_{cap1}$ reaches the level $V_{capH}$, while the LSS conduction interval 32 ends at the moment $V_{cap1}$ reaches the level $V_{capL}$.

For low output voltages, the waveform of the primary current $I_{prim}$ becomes more triangular in shape, as shown in FIG. 4a, the waveform reaching a maximum or minimum at the end of each conduction interval, i.e. the moment each conducting switch is switched off. FIGS. 4a to 4c illustrate various parameters over several switching cycles with $I_{peak}=2$, $P_{outrel}=0.15$ and $V_s=400V$. These effects can be explained by comparing the reflected output voltage $V_{outreflected}$ at the primary side in relation to the capacitor voltage $V_{cap1}$, as illustrated in FIG. 4b. With reference to FIG. 1a, $V_{outreflected}$ is the output voltage (during diode conduction) transformed to the primary side and available as a voltage across the magnetising inductance Lm (identified as L2 in FIGS. 1a and 1b). Because $V_{cap1}-V_{outreflected}$ is the voltage across the leakage inductance Ls (identified as L1 in FIGS. 1a and 1b), a positive dI/dt occurs through Ls provided $V_{cap1}>V_{outreflected}$. From FIGS. 3a and 3b, it can be seen that local maxima in $I_{prim}$ occur when $V_{cap1}=V_{outreflected}$. In FIGS. 4a and 4b, which relate to a low output voltage, $V_{cap1}>V_{outreflected}$ or the complete half cycle, resulting in only a rising or falling $I_{prim}$.

At these low output voltages, i.e. with low values of $P_{outrel}$, a second control method, known as $I_{peak}$ control, may be used in which the conduction intervals are ended as soon as the primary current $I_{prim}$ reaches $I_{peakH}$ (HSS) or $I_{peakL}$ (LSS), as shown in FIG. 4a. This method of control is better suited for low output voltages because of the triangular shape of the primary current waveform. In this case, the output current $I_{out}$, shown in FIG. 4c, is approximately proportional to the primary current $I_{prim}$, giving a first order response. This $I_{peak}$ control method is, however, not suited for moderate to nominal output voltage levels, due to the occurrence of local maxima and minima in the primary current profile, which results in undesirable asymmetric behaviour as the system switches between $V_{cap}$ control and $I_{peak}$ control within one cycle. This asymmetric behaviour is illustrated in FIGS. 5a to 5c, which show the results of a scheme alternating between $V_{cap}$ and $I_{peak}$ control, at 70% of nominal output voltage.

The schematic diagram in FIG. 6 illustrates the overall control loop for voltage regulation and current limiting, using the $V_{cap}$ and $I_{peak}$ control methods as described above. The controller receives the $V_{cap}$ and $I_{prim}$ signals from the driver and LLC converter, and provides the switching signals $Q_H$, $Q_L$ according to these signals in comparison with the $V_{bus}$ and $P_{outrel}$ levels. During normal operation the control loop regulates the output voltage $V_{out}$ of the converter to the desired value, with the signal $V_{out}-V_{ref}$ generating an error signal, a, in a feedback loop 52, which regulates the the output voltage by adaping $P_{outrel}$. During over-current conditions or during startup, however, the output voltage is lower than the desired value. In this situation, the output current $I_{out}$ of the converter is limited to a desired maximum by the feedback control loop 52 that is configured to overrule normal voltage regulation. During a current limiting operation mode, the feedback loop 52 still regulates the output current via the $V_{cap}$ control method, using the $P_{outrel}$ input. Below a certain $V_{out}$ level, however, the control method is changed from $V_{cap}$ control to $I_{peak}$ control, where $I_{peak}$ is used to regulate the output current $I_{out}$, as described above.

The control methods as described above result in certain problems and disadvantages. Firstly, from equation (3) above, it is clear that the gain of the converter is dependent on $1/V_{out}$. This results in a loop gain that is strongly depending on $V_{out}$.

A second issue is that, for low $V_{out}$ values, the output power $P_{out}$ decreases for a given output current $I_{out}$. As the output power $P_{out}$ is proportional to $1-(V_{capH}-V_{capL})/V_{bus}$, for low output powers the value of $V_{capH}-V_{capL}$ approaches the value of $V_{bus}$, resulting in an output power that is determined by the difference between two numbers that is close to zero.

Both of these effects, in combination with potential delays in comparators and other circuitry, result in a potential stability problem at low $V_{out}$ values. In a practical application, for $V_{out}$ less than approximately half of a nominal $V_{out}$ value, this issue becomes serious resulting in large current stress and a strong audio noise, due to the oscillation frequency of the instability.

For low $V_{out}$ values, the $I_{peak}$ control method can be used to regulate the output current $I_{out}$, giving an output current that is (roughly) proportional to $I_{peak}$ for each half cycle. However, for $V_{out}$ larger than a certain value, $I_{peak}$ control can not be used due to local maxima and minima in the primary current, as described above. In practice, this critical $V_{out}$ value also occurs at approximately half of the nominal $V_{out}$ value.

The changeover from $V_{cap}$ control to $I_{peak}$ control for low $V_{out}$ values complicates the application design, as the transfer functions from $P_{outrel}$ to $I_{out}$, and from $I_{peak}$ to $I_{out}$, are different. This requires extra attention to be paid to design of the feedback networks for both modes.

An example of the changeover from $V_{cap}$ control to $I_{peak}$ control is shown in FIGS. 7a to 7c, which illustrates the various parameters at an output power level $P_{outrel}$ of 0.4, corresponding to a relative output voltage level $V_{outrel}$ of 0.6. At this output power level, both $I_{peak}$ control and $V_{cap}$ control are possible, and both can result in the same output current. Two important effects arise from this. A first effect is that a local maximum or minimum occurs in the primary current $I_{prim}$, i.e. where $dI_{prim}/dt=0$, at, or just before, the switch-off moment, i.e. at the end of a conduction interval. A second effect is that the local maxima/minima occur when the reflected output voltage $V_{outreflected}$ (FIG. 7b) is equal to $V_{capH}$ (HSS) or $V_{capL}$ (LSS), because at that moment the voltage across the leakage inductance Ls (identified as L1 in FIGS. 1a and 1b) is equal to zero. The consequence of this for the current limit operation can be explained as follows.

At a given output current $I_{out}$, there is a certain output voltage where the second effect occurs. At the given output current it is clear that, for a larger $V_{out}$, the power output increases ($P_{out}=V_{out}\times I_{out}$), resulting in $V_{capH}$ and $V_{capL}$ being smaller than the reflected output voltage, $V_{outreflected}$, at the moment of switch-off, as shown in FIG. 7b. This can result in $I_{peak}$ control becoming unstable. For a smaller $V_{out}$, the power output decreases, resulting in $V_{capH}$ and $V_{capL}$ being larger than the reflected output voltage at the moment of switch-off. This results in a rising or falling slope in $I_{prim}$ at the switch-off moment, and a stable $I_{peak}$ control.

The necessity to combine both control methods therefore results in certain problems and disadvantages. Firstly, a discrete changeover point needs to be chosen, where control passes from $I_{peak}$ control to $V_{cap}$ control (and vice versa), with consequent differences in gain depending in a different way on $V_{bus}$ and $V_{out}$. This results in the need for an external definition of this changeover point, the peak current and the $V_{cap}$ control transfer curve, which complicates design of the converter.

Secondly, due to delays and non-ideal components, it is generally not possible in a practical application to find a correct and stable value for the changeover point without unacceptable compromises in stability and asymmetrical behaviour becoming necessary.

One possible solution could be to use more accurate frequency control during startup and over-current limit conditions. This would, however, have the disadvantage of including an extra oscillator with external settings. This would also result in extra transients at the moment when control passes from frequency control to $V_{cap}$ control and vice versa. Both of these issues would complicate the application design and increase system costs, and are therefore generally undesirable.

It is an object of the invention to address one or more of the above mentioned problems, and to provide a resonant converter having a simplified method of control for varying levels of output power.

In accordance with a first aspect of the invention there is provided a resonant converter for supplying electrical energy from a supply source to a load, the resonant converter comprising:

first and second series-arranged controllable switches for connection across the supply source;
a resonant tank circuit in electrical connection with the first and second switches;
a control circuit configured to generate control signals to open and close the first and second switches at a switching frequency and according to a relative output power signal received by the controller, such that non-overlapping conduction intervals are defined by opening and closing of the first and second switches, the control circuit configured to derive first and second voltage levels from the received relative output power signal;
a voltage compensation circuit configured to generate a periodic compensation voltage signal at the switching frequency, the compensation voltage signal having an amplitude dependent on a difference between a reference voltage and an output voltage of the converter when the output voltage is below the reference voltage,
wherein the control circuit is configured to monitor a node on the resonant tank and turn off the first switch to end the first conduction interval when a monitored voltage derived from the node is less than a sum of the first voltage level and the compensation voltage signal and to turn off the second switch to end the second conduction interval when the monitored voltage is greater than a sum of the second voltage level and the compensation voltage signal.

A resonant converter according to the invention has the advantage of providing a stable output current over a full range of power output levels, and without the need to switch between different modes of operation at low and high power output levels.

The control circuit of the resonant converter may be configured to sum each of the first and second voltage levels with the compensation voltage signal and compare the compensation voltage signal with the resulting summed voltages to determine the end of the first and second conduction intervals.

The control circuit may alternatively be configured to sum the monitored voltage with the compensation voltage signal and compare the resulting summed voltage with the first and second voltage levels to determine the end of the first and second conduction intervals.

The compensation voltage signal may comprise a triangular waveform having a first slope coincident with the first conduction interval and a second slope coincident with the second conduction interval. The first and second slopes of the waveform are preferably proportional to the difference between the monitored voltage and the reference voltage.

The monitored node may be between a primary transformer winding and a capacitor of the resonant tank circuit, and the monitored voltage being the voltage at the monitored node.

The monitored node may alternatively be between the first and second switches, the monitored voltage being a difference between the voltage at the node and an integral of current through a primary portion of the resonant tank circuit.

The monitored voltage derived from the node may be the voltage across the transformer (identified as $V_{cap1}$ in FIG. 1a), or may be the voltage $V_{cr}$ across the resonant capacitor $C_r$. In the latter case, the high and low voltage levels $V_{capH}$, $V_{capL}$ can be adjusted accordingly, i.e. the high level for $V_{cr}$, $V_{crH}=V_s-V_{capH}$, and the low voltage level $V_{crL}=0-V_{capL}$.

The resonant converter is preferably of the LLC type, and may be a half bridge or full bridge converter. Other types of resonant converters such as LCC converters are envisaged to be adaptable to operate in accordance with the invention.

The compensation voltage signal generated by the voltage compensation circuit may have an amplitude proportional to the difference between the reference voltage and the output voltage of the converter when the output voltage is below the reference voltage. The compensation voltage signal may alternatively have an amplitude that is dependent on the difference between the reference voltage and output voltage but is not proportional to this difference, for example in the form of discrete steps, a fixed relationship or a non-linear relationship.

In accordance with a second aspect of the invention there is provided a method of operating a resonant converter for supplying electrical energy from a supply source to a load, the resonant converter comprising:

first and second series-arranged controllable switches for connection across the supply source;
a resonant tank circuit in electrical connection with the first and second switches;
a control circuit; and
a voltage compensation circuit,
the method comprising:
generating control signals by the control circuit to open and close the first and second switches at a switching frequency and according to a relative output power signal received by the controller, such that non-overlapping conduction intervals are defined by opening and closing of the first and second switches, the control circuit configured to derive first and second voltage levels from the received relative output power signal; and
generating a periodic compensation voltage signal at the switching frequency by the voltage compensation circuit, the compensation voltage signal having an amplitude dependent on a difference between a reference voltage and an output voltage of the converter when the output voltage is below the reference voltage,
wherein the control circuit monitors a node on the resonant tank and turns off the first switch to end the first conduction interval when a monitored voltage derived from the node is less than a sum of the first voltage level and the compensation voltage signal and turns off the second switch to end the second conduction interval when the monitored voltage is greater than a sum of the second voltage level and the compensation voltage signal.

According to a general aspect, the invention relates to a resonant converter comprising a voltage compensation circuit configured to generate a periodic compensation voltage signal at a switching frequency of the converter such that conduction intervals are ended according to first and second voltage levels in combination with the periodic compensation signal.

The invention will now be described by way of example and with reference to the accompanying drawings, in which.

An object of the invention is to include a compensation signal in the $V_{cap}$ control method in such a way that stable operation occurs for the whole $V_{out}$ window from $V_{out}=0$ upward. It would therefore no longer be necessary to change over to the $I_{peak}$ control mode of operation for low $V_{out}$ levels. $I_{peak}$ control may still occurs, but could be confined only to emergency situations or during the first few cycles at startup before the resonant capacitor has charged to its average DC voltage. During all normal operation, the control method described below would apply.

Because the primary current tends towards having a triangular waveform for low $V_{out}$ levels, which results in stable operation, it should be possible to add a representation of the primary current to the signal $V_{cap}$ or to both signals $V_{capH}$, $V_{capL}$, in order to change the $V_{cap}$ control method in such a way that a similar response occurs as with the $I_{peak}$ control method. This representation could derived from the momentary value of the primary current itself, or from a generated triangular signal or an other signal with a certain well defined slope around the switching points.

Because the $V_{cap}$ control method best operates without compensation for levels where $V_{out}$ is greater than approximately half of the nominal output voltage level $V_{outnom}$, the amplitude of this compensation signal can be made a function of $V_{out}$, for example being proportional to $(V_{outnom}-V_{out})$ or $(V_{out1}-V_{out})$, where $V_{out1}$ is a certain predetermined $V_{out}$ value. For values of $V_{out}$ above $V_{out1}$, no compensation is required.

As an alternative embodiment within the scope of the invention is where the signal $V_{cap}$ is obtained from the voltage across a separate auxiliary winding. This embodiment may be useful where the resonant capacitor $C_r$ is split between ground and $V_{bus}$ and is connected at the ground side of the transformer, resulting in $V_{cap}$ not being directly available.

Figure 1A:
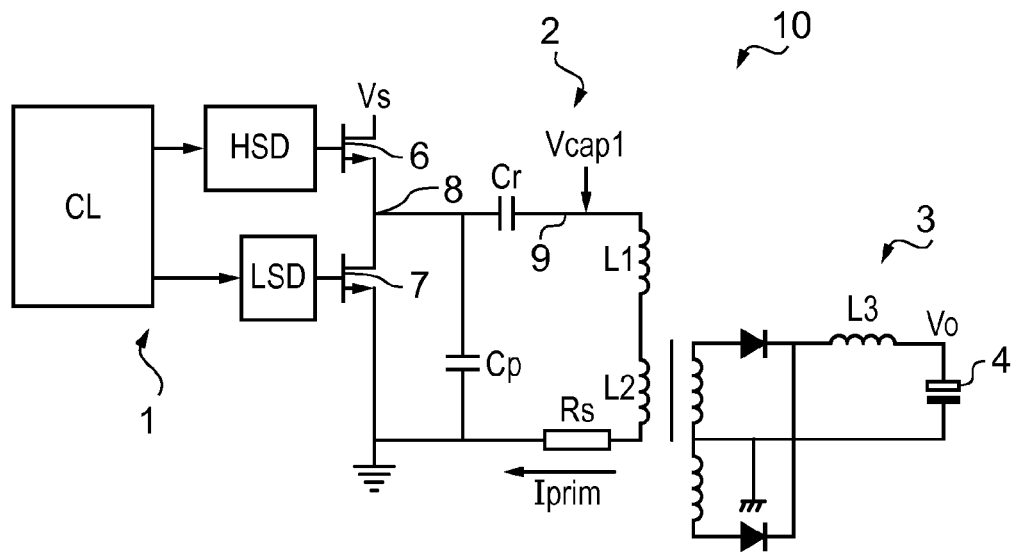
FIG. 1a is a schematic circuit diagram of an exemplary half-bridge LLC converter.
Figure 1B:
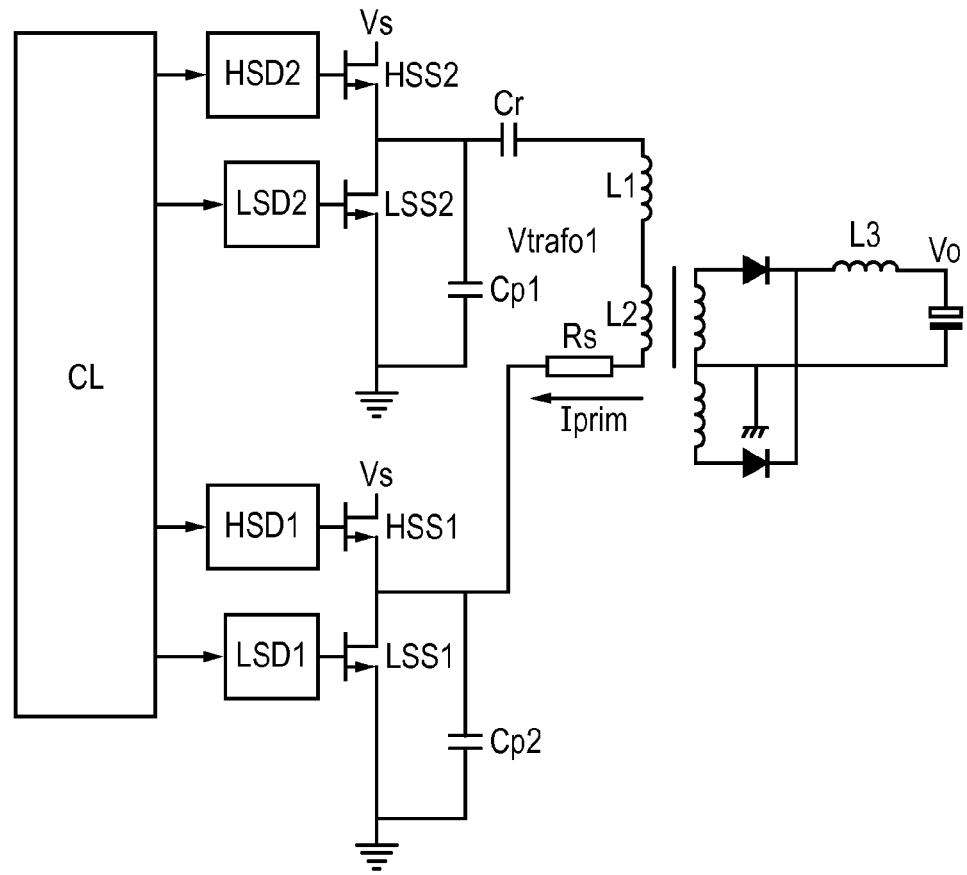
FIG. 1b is a schematic circuit diagram of an exemplary full-bridge LLC converter.

A further alternative embodiment is where the signal $V_{cap}$ is indirectly created by a signal representing $V_{hb}$ such as an integrated version of $I_{prim}$. This embodiment may be useful if a kind of resonant converter is used where the resonant capacitor is not in series with the resonant inductor Ls (identified as L1 in FIGS. 1a and 1b).

Figure 2:
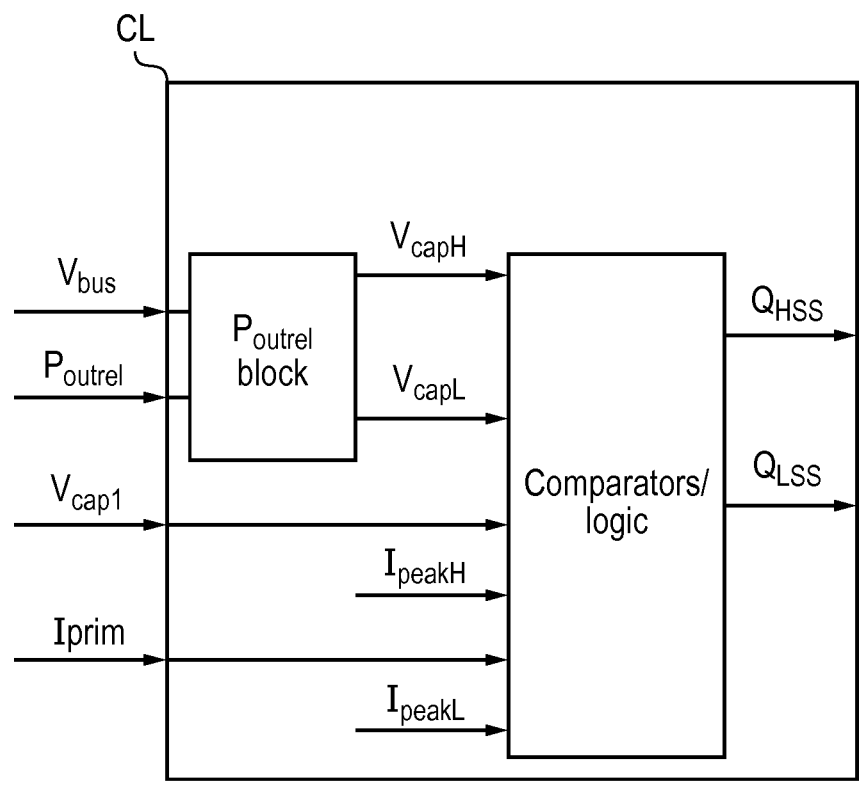
FIG. 2 is a schematic diagram of the control logic of FIG. 1a or 1b.
Figure 3A:
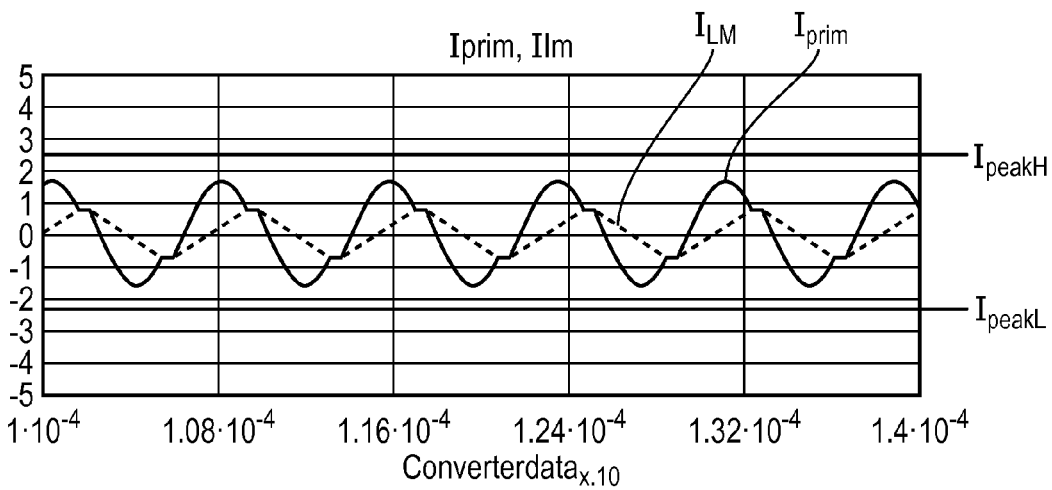
FIGS. 3a to 3c illustrate measurements of current and voltage over several cycles of operation of an exemplary converter operating according to a $V_{cap}$ control scheme.
Figure 3B:
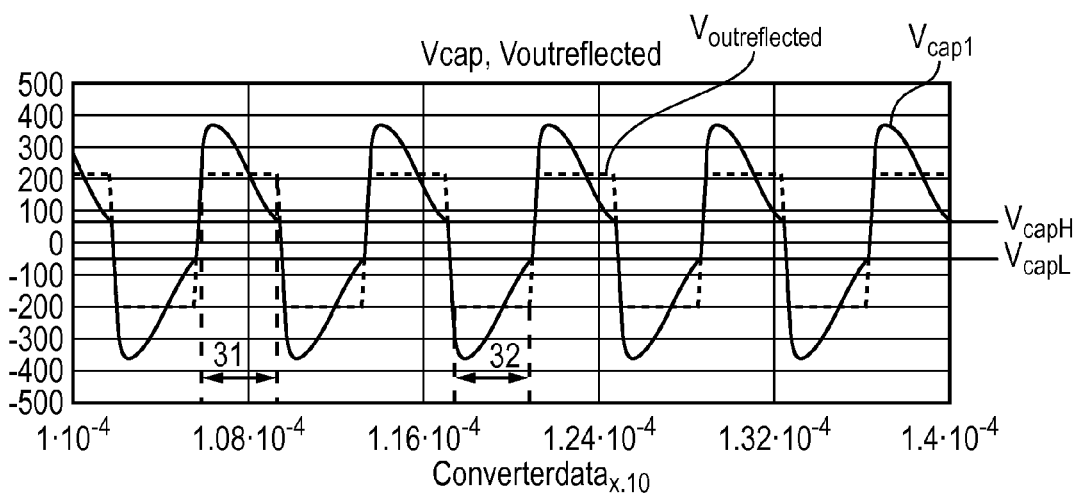
Figure 3C:
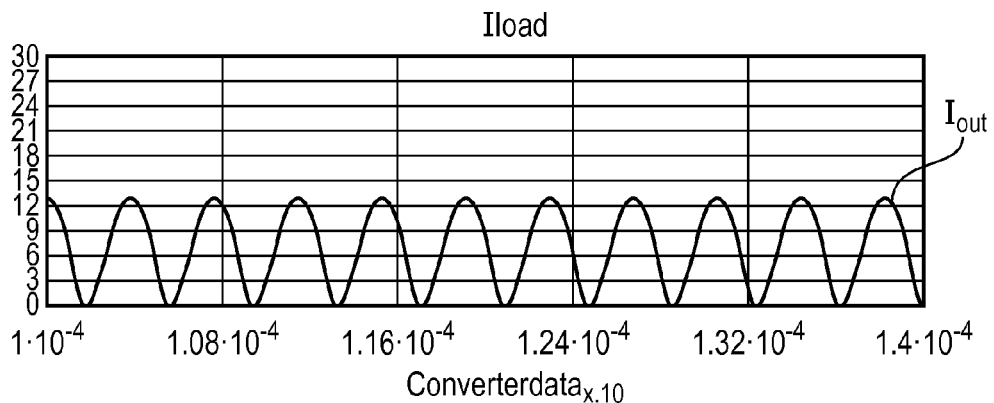
Figure 4A:
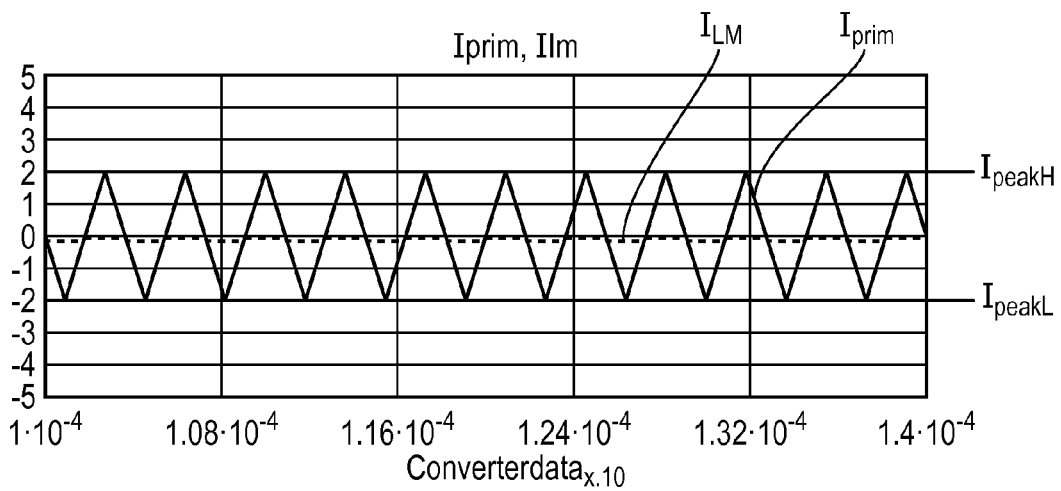
FIGS. 4a to 4c illustrate measurements of current and voltage over several cycles of operation of an exemplary converter operating according to an $I_{peak}$ control scheme.
Figure 4B:
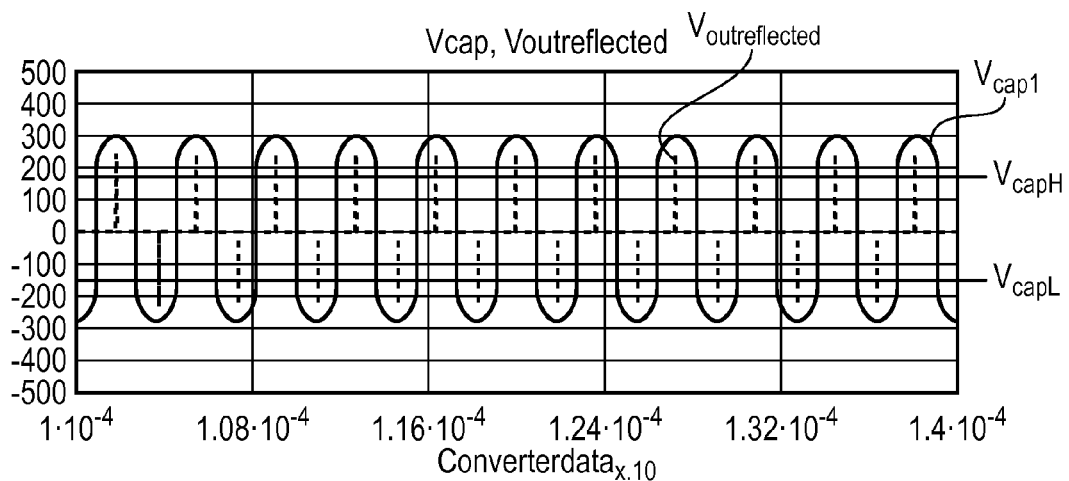
Figure 4C:
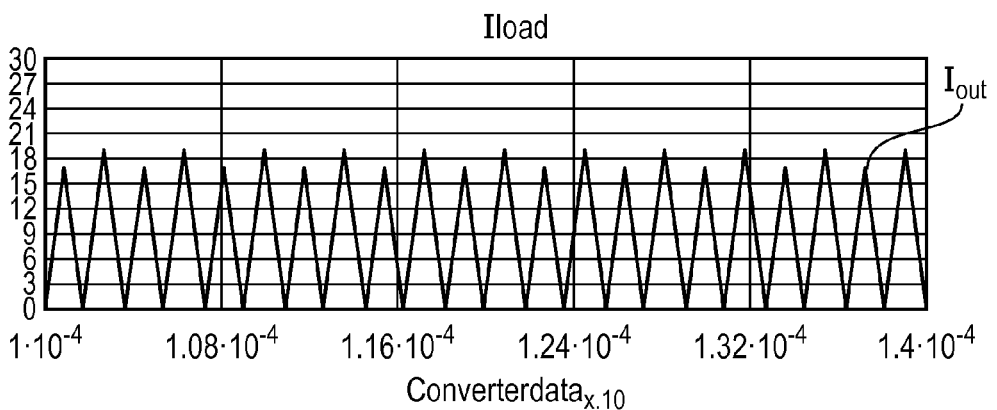
Figure 5A:
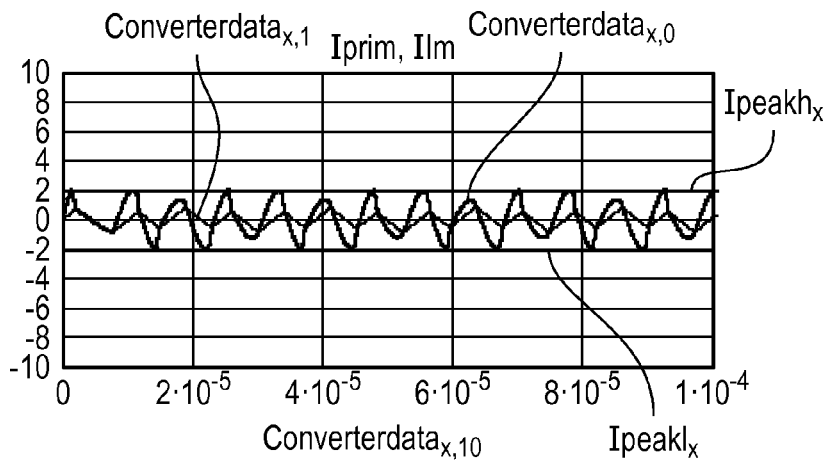
FIGS. 5a to 5c illustrate measurements of current and voltage over several cycles of operation of an exemplary converter operating according to a scheme alternating between $V_{cap}$ and $I_{peak}$ control.
Figure 5B:
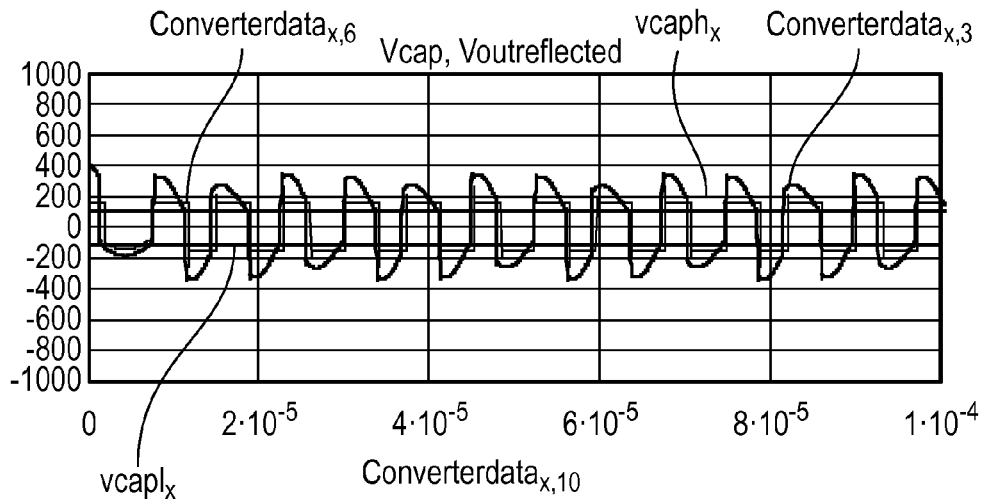
Figure 5C:
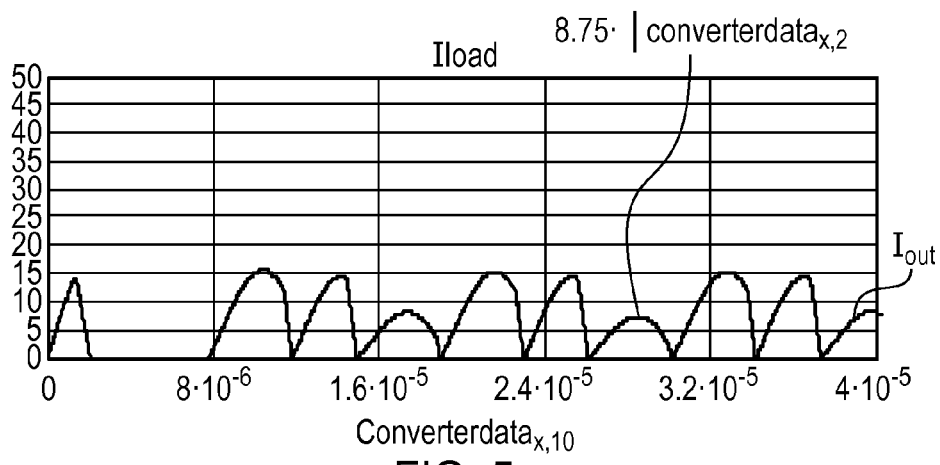
Figure 6:
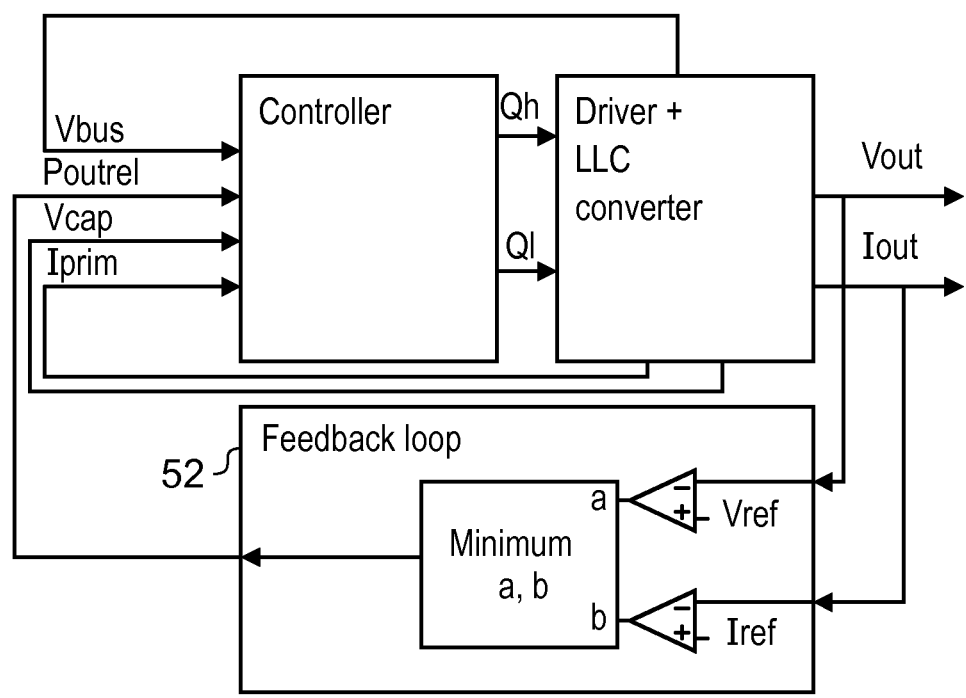
FIG. 6 is a schematic diagram of a control loop for controlling operation of an exemplary converter.
Figure 7A:
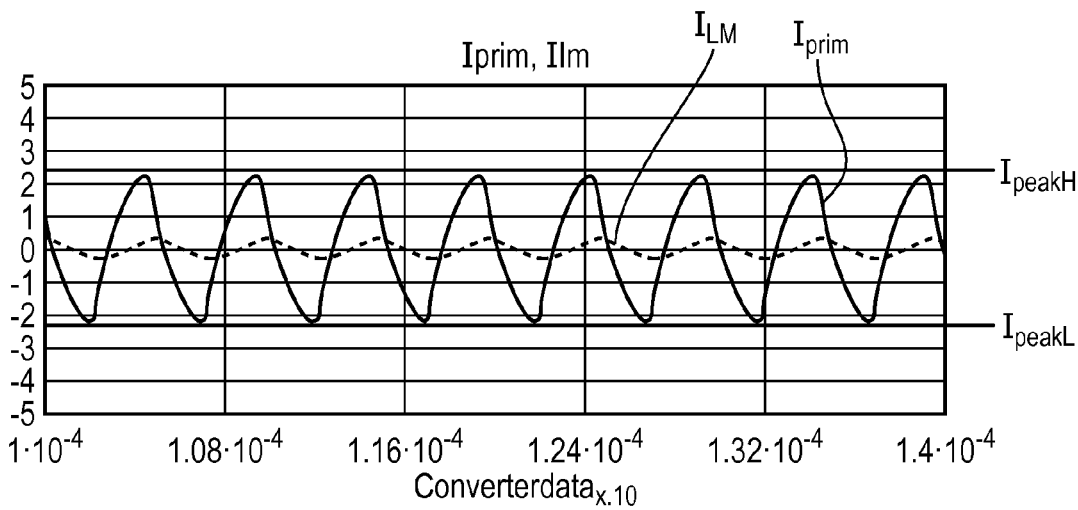
FIG. 7 illustrate measurements of current and voltage over several cycles of operation of an exemplary converter operating at a region between $V_{cap}$ and $I_{peak}$ control schemes.
Figure 7B:
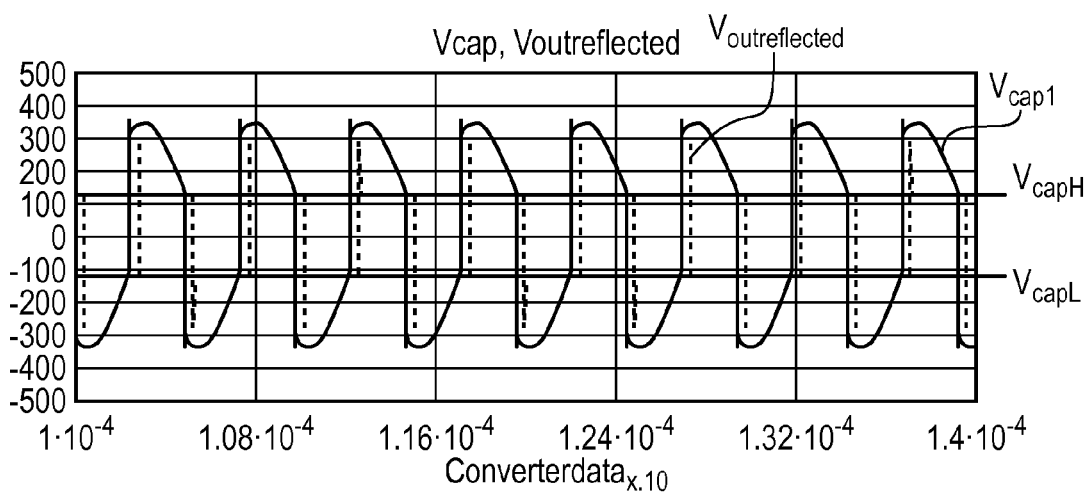
Figure 7C:
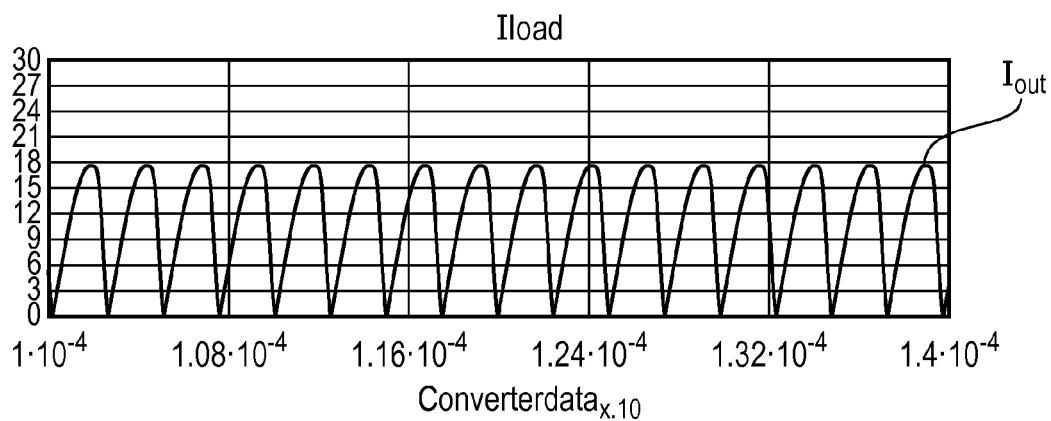
Figure 8:
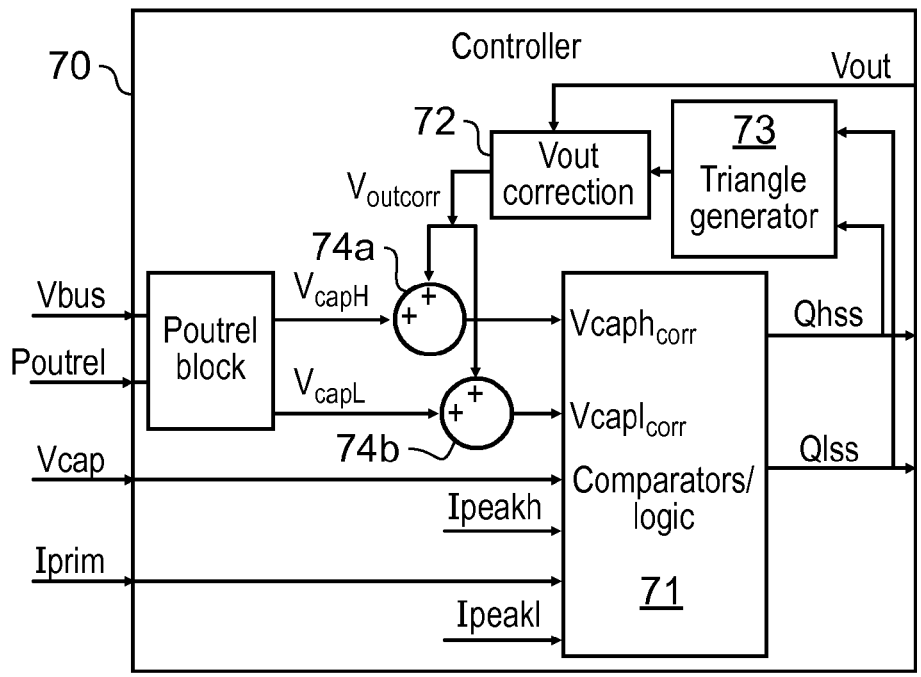
FIG. 8 is a schematic diagram of a first exemplary embodiment of a controller.
Figure 9:
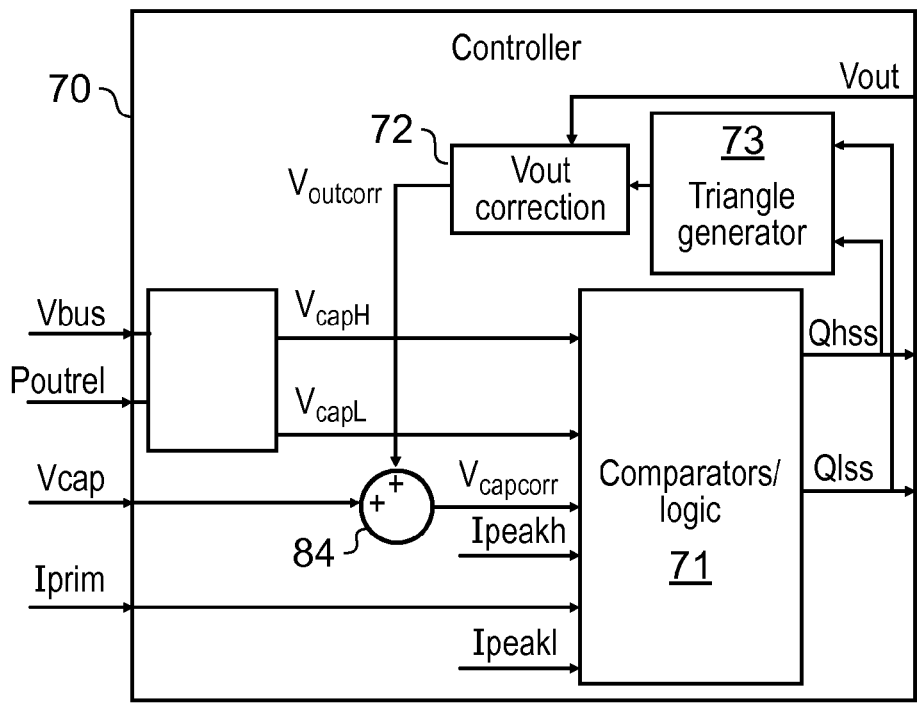
FIG. 9 is a schematic diagram of a second exemplary embodiment of a controller.

Starting with the exemplary converter of FIG. 2, a triangular compensation signal, having an amplitude that is a function of $V_{out}$, may be added to the $V_{capH}$ and $V_{capL}$ signals, resulting in the modified controller configuration shown in FIG. 8. A triangular signal generator module 73 receives the switching signals $Q_{HSS}$, $Q_{LSS}$ from the comparator module 70, and generates a triangular signal having a waveform with peaks coincident with the switching points. This triangular signal is scaled according to the $V_{out}$ level, resulting in a signal fed to summing units 74a, 74b to produce corrected versions of the $V_{capH}$ and $V_{capL}$ signals, which are fed to the $V_{capH}$ and $V_{capL}$ inputs of the comparator module 70. The triangular compensation signal may alternatively be added to the $V_{cap}$ signal, as shown in FIG. 9.

In the first embodiment of FIG. 8, the comparator module 71 of the controller 70 is configured to end the HSS conduction interval when $V_{cap}$ falls below $V_{capHcorr}$, and to end the LSS conduction interval when $V_{cap}$ exceeds $V_{capLcorr}$. This can be expressed as follows:

HSS off if $V_{cap}<V_{capH}+V_{outcorr}$; and

LSS off if $V_{cap}>V_{capL}+V_{outcorr}$, where $V_{outcorr}$ is the output correction signal from the $V_{out}$ correction module 72.

In the second embodiment of FIG. 9, the comparator module 71 of the controller 70 is configured to end the HSS conduction interval when the sum of $V_{cap}$ and $V_{outcorr}$, $V_{capcorr}$, obtained from summing unit 84, falls below $V_{capH}$, and to end the LSS conduction interval when the sum of $V_{cap}$ and $V_{outcorr}$, exceeds $V_{capL}$. This can be expressed as follows:

HSS off if $V_{cap}+V_{outcorr}<V_{capH}$; and

LSS off if $V_{cap}+V_{outcorr}>V_{capL}$.

Figure 10:
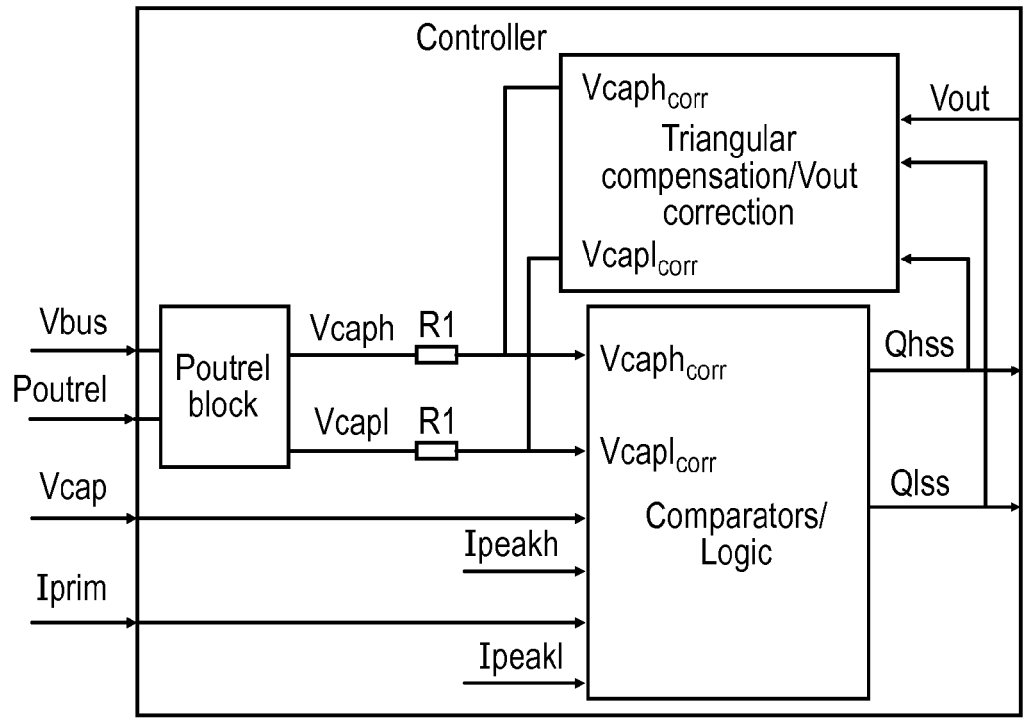
FIG. 10 is a schematic diagram of an exemplary implementation of the embodiment of FIG. 8.
Figure 11:
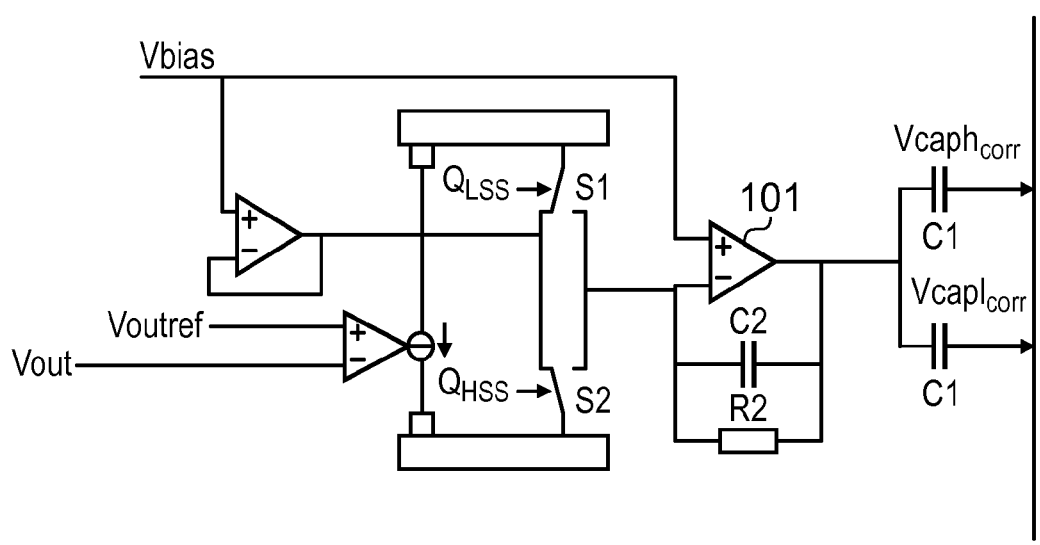
FIG. 11 is a schematic diagram of a voltage compensation circuit.
Figure 12:
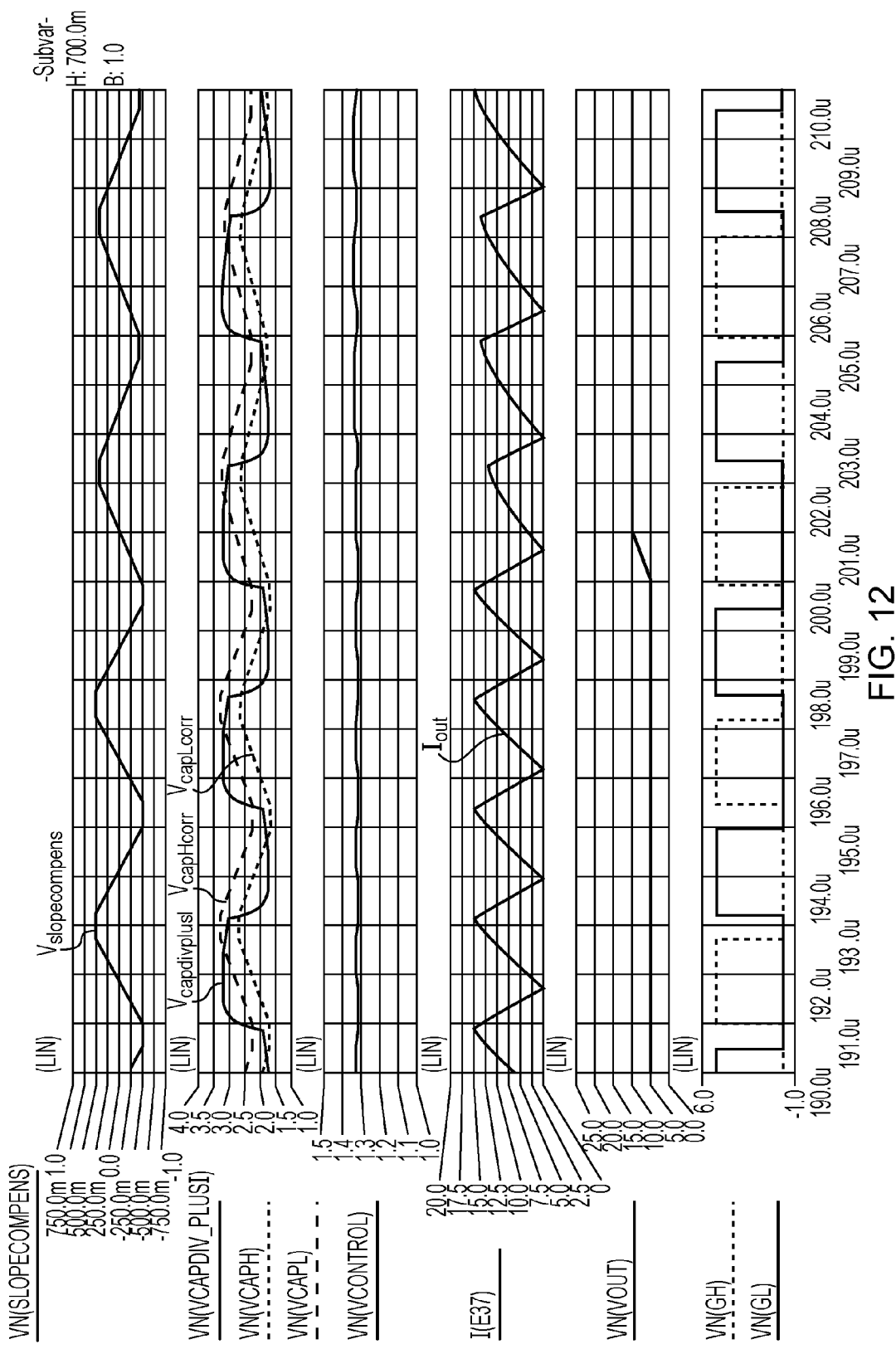
FIG. 12 is a series of measurements of voltages and currents from an exemplary converter.

As a practical implementation of a triangular compensation scheme, a laboratory demonstration board of an LLC converter having a bus voltage $V_{bus}$ of 400V, a 24V nominal output voltage $V_{outnom}$, and incorporating a current limit with triangular compensation according to the invention is illustrated in FIG. 10, with a combined triangular compensation and $V_{out}$ correction module illustrated in FIG. 11. FIG. 12 illustrates various measured signals from the converter, including $V_{capHcorr}$, $V_{capLcorr}$, and the output current signal $I_{out}$. The signal $V_{capdivplusl}$ is the result of the signal $V_{cap}$ after being passed through an RC filter to remove high frequency spikes. The signal $V_{slopecompens}$ is the output of the integrator of the triangular waveform generator, as described below with reference to FIG. 11.

As illustrated in FIG. 11, the triangular compensation signal is produced by a transconductance amplifier that is configured to deliver an output current proportional to the output voltage $V_{out}$ and a reference voltage $V_{outref}$, i.e. $V_{outref}-V_{out}$, provided $V_{out}$ is smaller than $V_{outref}$. The output current of the transconductance amplifier is mirrored and connected to the input of an integrator 101, having an integrator capacitance C2, by 2 switches S1, S2. The switches S1, S2 are controlled by the HSS, LSS conducting stroke, indicated by $Q_{LSS}$, $Q_{HSS}$. The output of the circuit is a triangular waveform having a slope that is dependent on the level of $V_{out}$. A resistor R2 makes the integrator non ideal and defines a DC value for the triangular waveform. FIG. 11 also illustrates a practical way of implementing the summation points 74a, 74b of the basic principle of FIG. 8, through the use of capacitive coupling with capacitors C1 (FIG. 11) into output resistances R1 (FIG. 10). This results in a delay time in the loop that provides a restriction to the bandwidth of the current limit loop. This method of capacitive coupling is a simple way to realize the adding node in a prototype implementation. In an integrated circuit implementation, the adding nodes 74a, 74b may be realized without an RC delay, giving the advantage of a higher potential bandwidth of the current limit loop.

Figure 13:
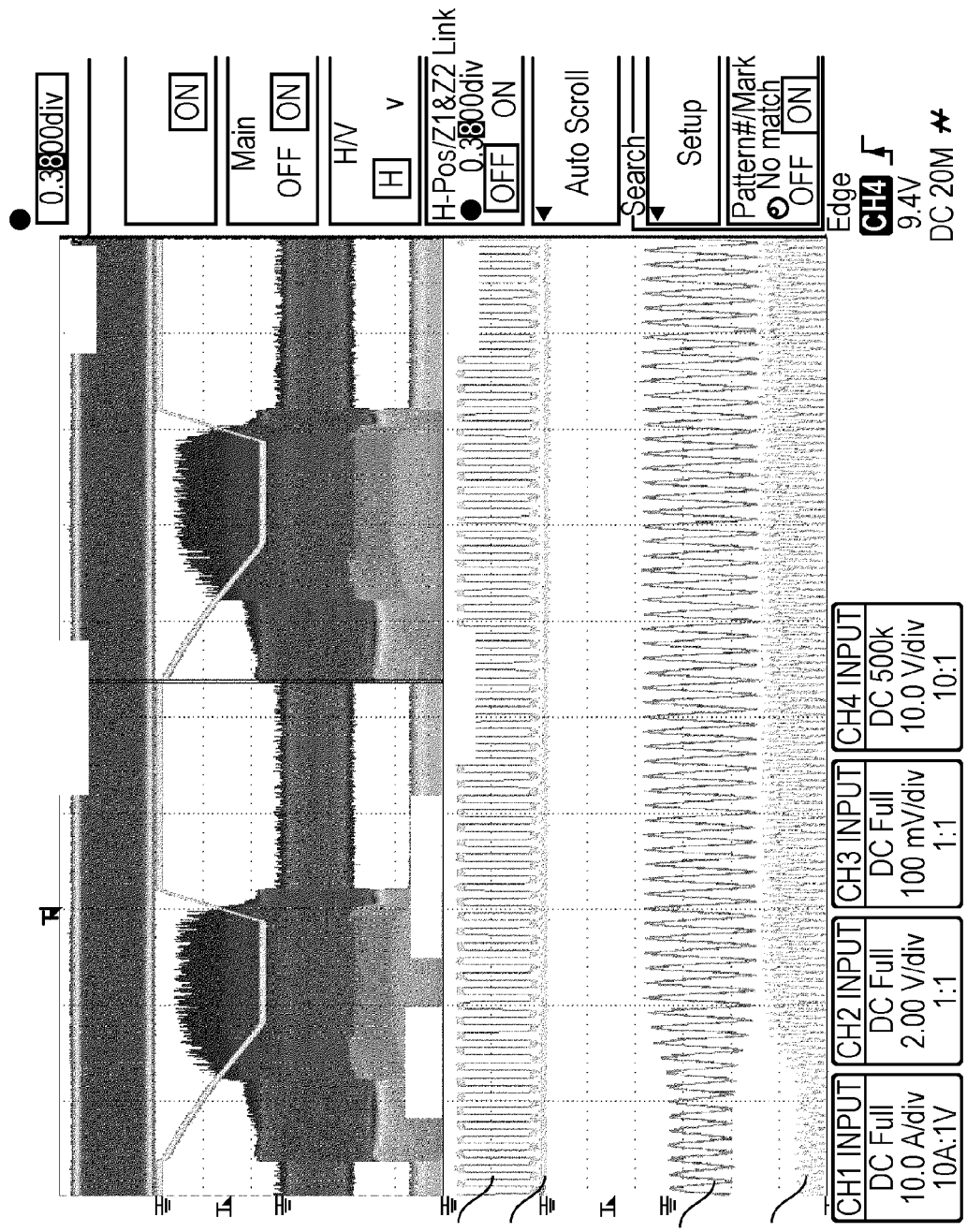
FIGS. 13 to 17 illustrate a series of measurements from exemplary converters with and without voltage compensation applied.
Figure 14:
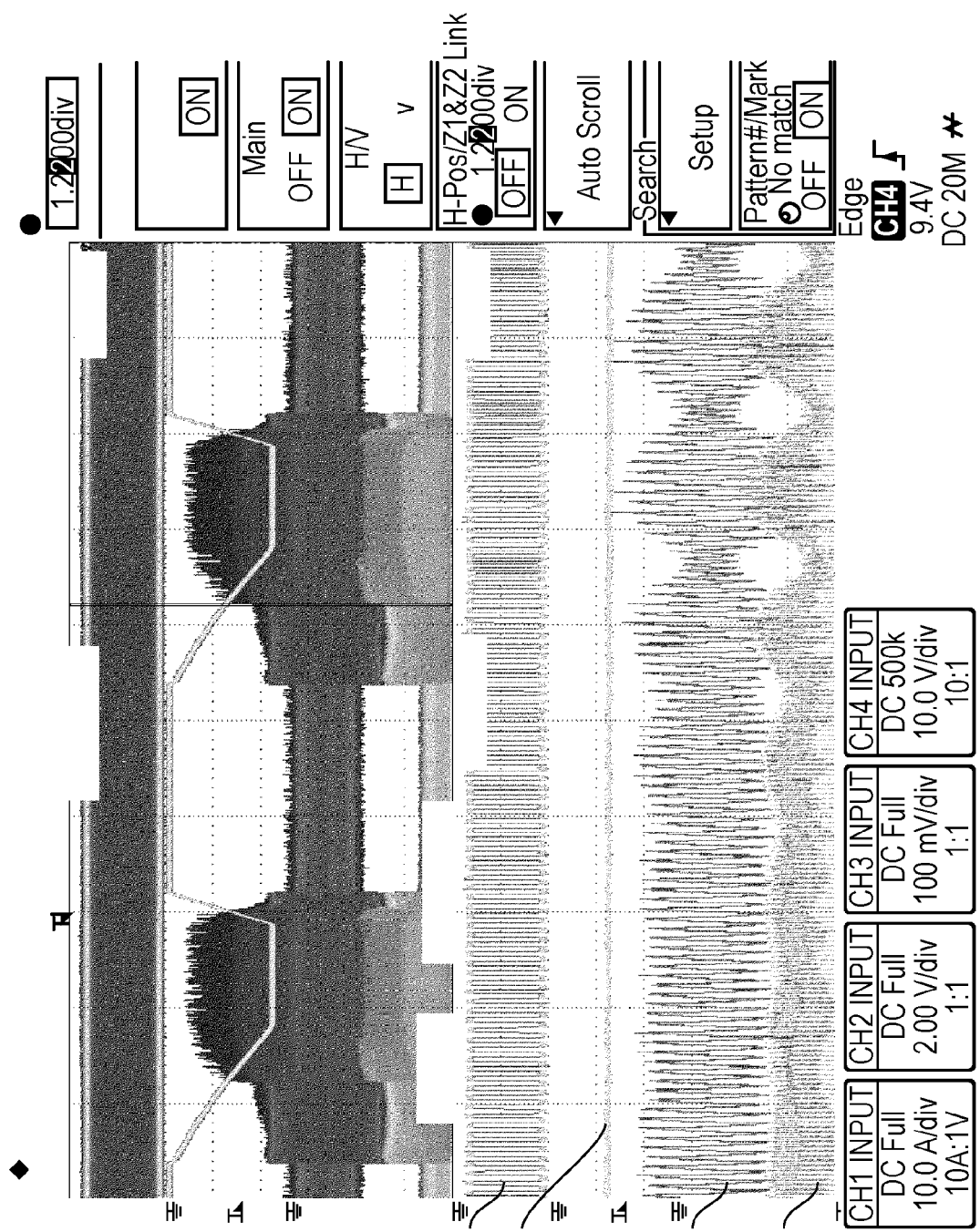
Figure 15:
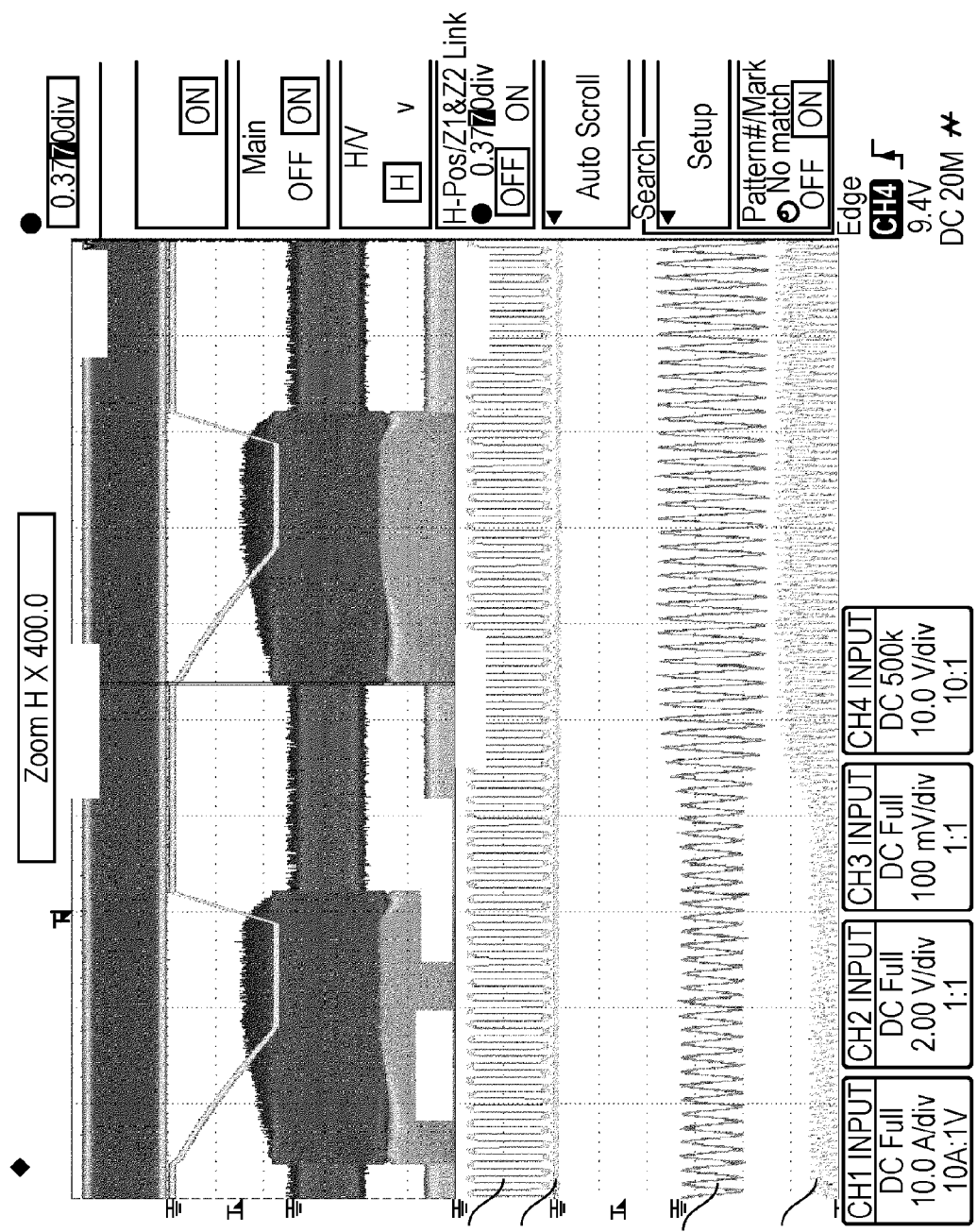
Figure 16:
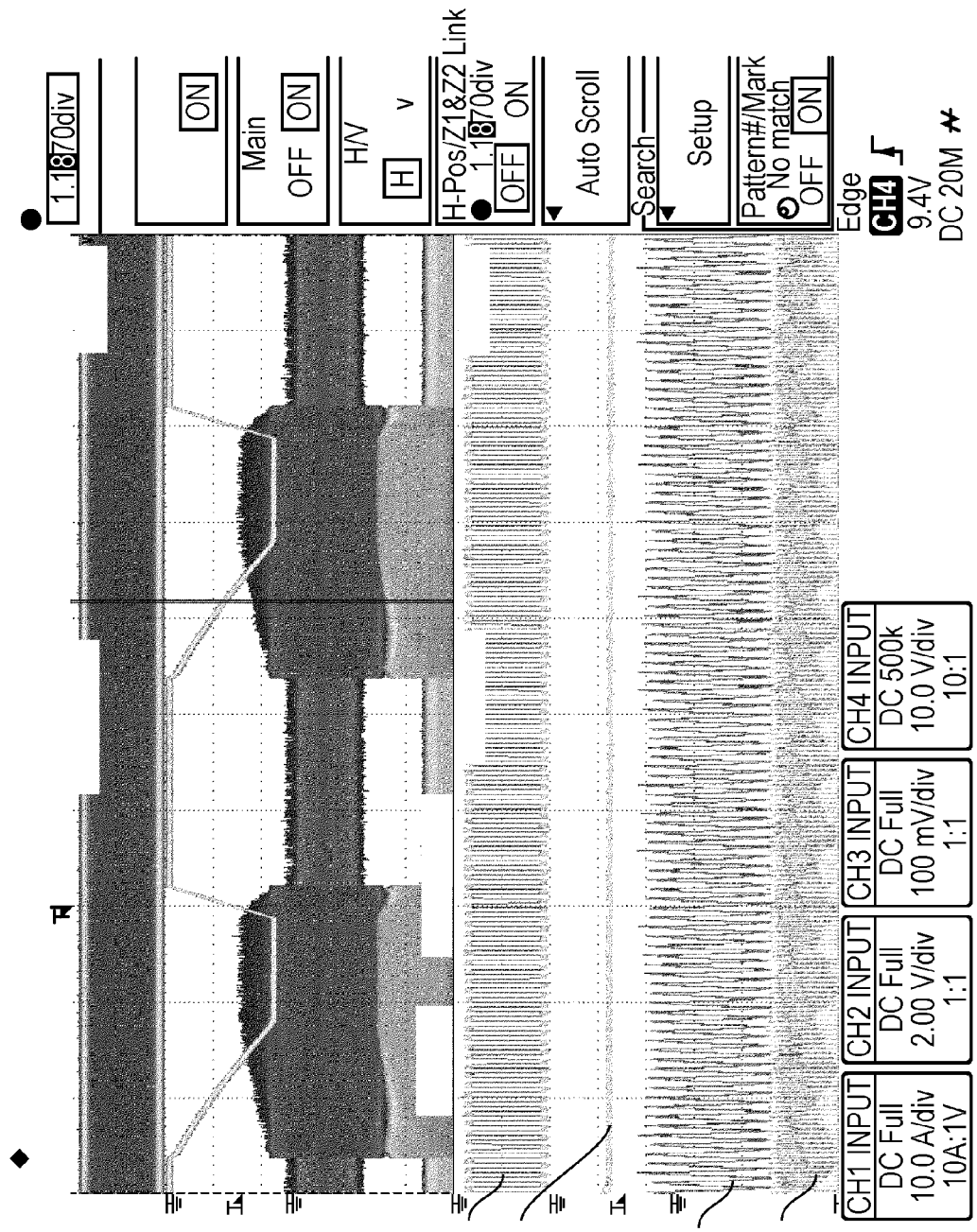
Figure 17:
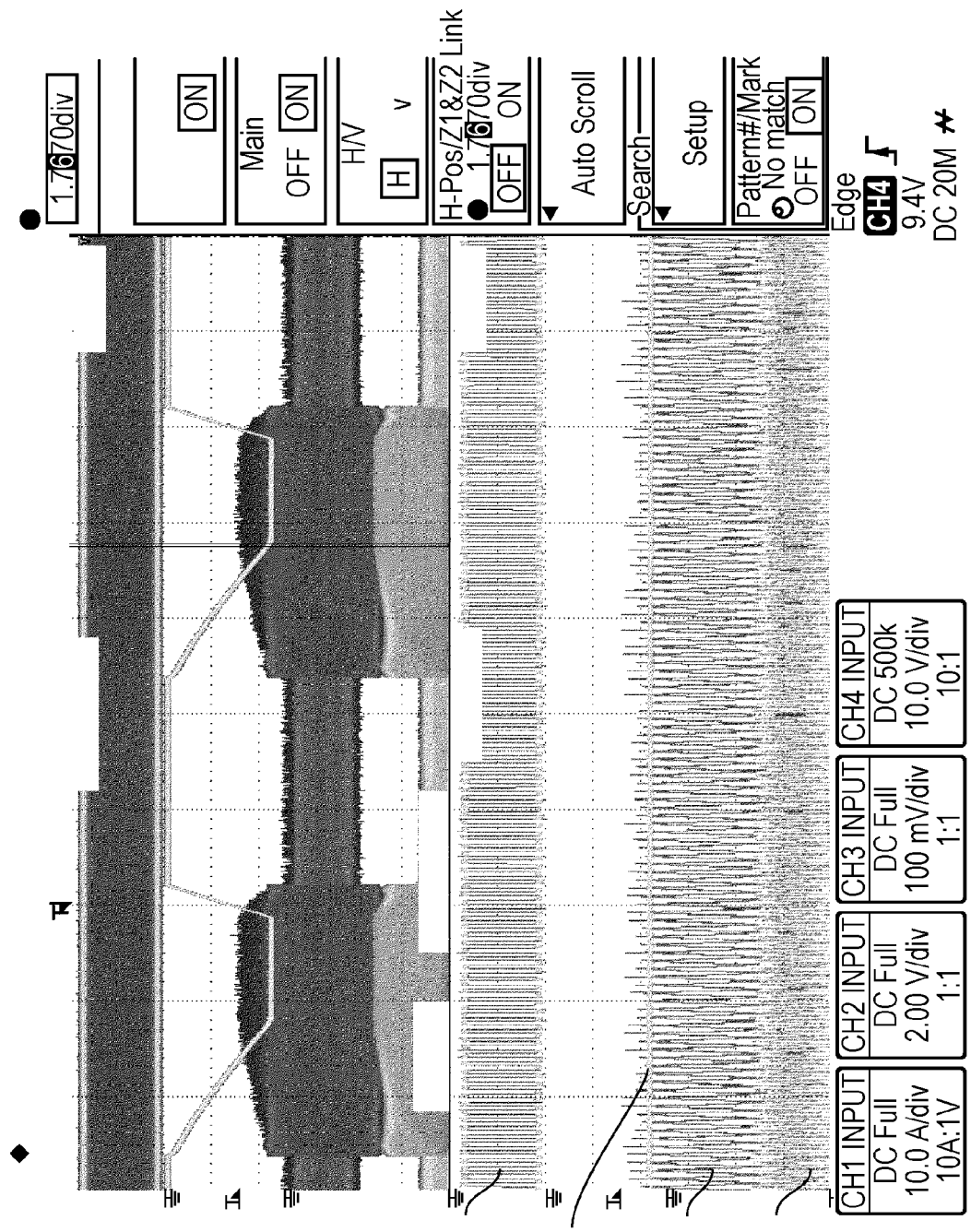

In FIGS. 13 to 17, some measurement results of an exemplary converter are shown, both without compensation (FIGS. 13 and 14) and with compensation according to an embodiment of the invention (FIGS. 15-17). In each set of results, Channel 1 (Ch1) is the output current $I_{out}$ after the secondary diodes, Channel 2 (Ch2) is the HB node voltage $V_{HB}$, Channel 3 (Ch3) is the primary current $I_{prim}$ and Channel 4 (Ch4) is the output voltage $V_{out}$.

FIG. 13 shows results from the converter at nominal $V_{out}$ levels, where the primary and output current levels are stable. FIG. 14 illustrates measurements taken without compensation and at half of nominal $V_{out}$, where it is clear that an instability occurs for these smaller $V_{out}$ levels, as demonstrated by oscillations in the primary and output currents in Ch1 and Ch2. Because the peak value of the primary current is determined by the $I_{peak}$ control method, this limits the amplitude of the oscillation. The oscillation frequency of this instability, however, results in a very strong undesirable audio noise during over current conditions and during startup. The cause of this instability is due to the increase in loop gain for low $V_{out}$ levels in combination with the effects of parasitics and slightly changed transient behaviour of the resonant tank at low output voltage.

FIGS. 15 to 17 illustrate an exemplary converter operating according to a compensation method of the invention, at nominal output levels (FIG. 15), half nominal levels (FIG. 16) and low levels (FIG. 17). As can be seen, a stable response in $I_{out}$ and $I_{prim}$ results at all levels of $V_{out}$, as expected.

Converters according to the embodiments described herein may be applied in various applications such as voltage supply adapters, and have particular advantage in being used for power levels above around 100 Watts. Such adapters may be particularly suitable for portable equipment, but may also be used as power supply units for other applications such as computers, both desktop and server types, televisions and many other electronic applications.

Other embodiments are intentionally within the scope of the invention, which is defined by the appended claims.

The invention claimed is:

1. A resonant converter for supplying electrical energy from a supply source to a load, the resonant converter comprising:
   first and second series-arranged controllable switches for connection across the supply source;
   a resonant tank circuit in electrical connection with the first and second switches;
   a control circuit configured to generate control signals to open and close the first and second switches at a switching frequency and according to a relative output power signal received by the controller, such that non-overlapping conduction intervals are defined by opening and closing of the first and second switches, the control circuit configured to derive first and second voltage levels from the received relative output power signal;
   a voltage compensation circuit configured to generate a periodic compensation voltage signal at the switching frequency, the compensation voltage signal having an amplitude dependent on a difference between a reference voltage and an output voltage of the converter when the output voltage is below the reference voltage,
   wherein the control circuit monitors a node on the resonant tank and turn off the first switch to end the first conduction interval when a monitored voltage derived from the node is less than a sum of the first voltage level and the compensation voltage signal and to turn off the second switch to end the second conduction interval when the monitored voltage is greater than a sum of the second voltage level and the compensation voltage signal.

2. The resonant converter of claim 1 wherein the control circuit is configured to sum each of the first and second voltage levels with the compensation voltage signal and compare the compensation voltage signal with the resulting summed voltages to determine the end of the first and second conduction intervals.

3. The resonant converter of claim 1 wherein the control circuit is configured to sum the monitored voltage with the compensation voltage signal and compare the resulting summed voltage with the first and second voltage levels to determine the end of the first and second conduction intervals.

4. The resonant converter of claim 1 wherein the compensation voltage signal comprises a triangular waveform having a first slope coincident with the first conduction interval and a second slope coincident with the second conduction interval.

5. The resonant converter of claim 4 wherein the first and second slopes are proportional to the difference between the monitored voltage and the reference voltage.

6. The resonant converter of claim 1 wherein the node is between a primary transformer winding and a capacitor of the resonant tank circuit, the monitored voltage being the voltage at the node.

7. The resonant converter of claim 1 wherein the node is between the first and second switches, the monitored voltage being a difference between the voltage at the node and an integral of current through a primary portion of the resonant tank circuit.

8. The resonant converter of claim 1 wherein the resonant converter is a resonant LLC converter.

9. The resonant converter of claim 1 wherein the resonant converter is a resonant LCC converter.

10. The resonant converter of claim 1 wherein the resonant converter is a full bridge resonant converter.

11. The resonant converter of claim 1 wherein the compensation voltage signal has an amplitude proportional to the difference between the reference voltage and the output voltage of the converter when the output voltage is below the reference voltage.

12. A method of operating a resonant converter for supplying electrical energy from a supply source to a load, the resonant converter comprising:
   first and second series-arranged controllable switches for connection across the supply source;
   a resonant tank circuit in electrical connection with the first and second switches;
   a control circuit; and
   a voltage compensation circuit,
   the method comprising:
      generating control signals by the control circuit to open and close the first and second switches at a switching frequency and according to a relative output power signal received by the controller, such that non-overlapping conduction intervals are defined by opening and closing of the first and second switches, the control circuit configured to derive first and second voltage levels from the received relative output power signal; and
      generating a periodic compensation voltage signal at the switching frequency by the voltage compensation circuit, the compensation voltage signal having an amplitude dependent on a difference between a reference voltage and an output voltage of the converter when the output voltage is below the reference voltage,
   wherein the control circuit monitors a node on the resonant tank and turns off the first switch to end the first conduction interval when a monitored voltage derived from the node is less than a sum of the first voltage level and the compensation voltage signal and turns off the second switch to end the second conduction interval when the monitored voltage is greater than a sum of the second voltage level and the compensation voltage signal.

* * * * *